US006081600A

United States Patent [19]
Blanchard et al.

[11] Patent Number: 6,081,600
[45] Date of Patent: Jun. 27, 2000

[54] METHOD AND APPARATUS FOR SIGNALING PRIVACY IN PERSONAL COMMUNICATIONS SYSTEMS

[75] Inventors: Scott David Blanchard, Mesa; Dean Paul Vanden Heuvel, Chandler; Joseph Olk Lester, Mesa, all of Ariz.

[73] Assignee: Motorola, Inc., Schaumburg, Ill.

[21] Appl. No.: 08/939,720

[22] Filed: Oct. 3, 1997

[51] Int. Cl.[7] .................................................. H04L 9/00
[52] U.S. Cl. ........................ 380/255; 380/259; 380/260; 380/268; 380/270; 455/410; 455/422
[58] Field of Search .................................. 455/410, 411, 455/415, 422, 451, 458, 461, 551; 380/44, 48, 247, 248, 249, 271, 273, 202, 239, 264

[56] References Cited

U.S. PATENT DOCUMENTS

| | | | |
|---|---|---|---|
| 4,799,061 | 1/1989 | Abraham et al. | 340/825.34 |
| 5,081,679 | 1/1992 | Dent | 380/48 |
| 5,091,942 | 2/1992 | Dent | 380/46 |
| 5,148,485 | 9/1992 | Dent | 380/46 |
| 5,243,653 | 9/1993 | Malek et al. | 380/48 |
| 5,455,863 | 10/1995 | Brown et al. | 380/23 |
| 5,455,864 | 10/1995 | Park | 380/43 |
| 5,592,555 | 1/1997 | Stewart | 380/49 |
| 5,619,572 | 4/1997 | Sowa | 380/21 |
| 5,689,563 | 11/1997 | Brown et al. | 380/23 |
| 5,727,064 | 3/1998 | Reeds, III | 380/49 |
| 5,748,734 | 5/1998 | Mizikovsky | 380/21 |
| 5,825,889 | 10/1998 | Dent | 380/49 |
| 5,850,444 | 12/1998 | Rune | 380/21 |

*Primary Examiner*—Tod R Swann
*Assistant Examiner*—Paul E. Callahan
*Attorney, Agent, or Firm*—Sherry J. Whitney; Gregory J. Gorrie

[57] ABSTRACT

A system and method provides signaling privacy for communications between nodes of a communications network (30). Multiple logical links exist between distinct network nodes (38–40, 42, 50–53) of the communication network (30). Signaling privacy is achieved by a subscriber unit (80) providing encryption/decryption of signaling data messages at the messaging level. The subscriber unit (80) employs a signaling encryptor/decryptor (86) along the signaling path, which enables the signaling data messages to be separately encrypted from data on the traffic channel. The encrypted signaling data can then be sent along a different logical link from the traffic, while maintaining cipher key synchronization between the signaling encryptor/decryptor (86) and a network encryptor/decryptor (78) at a remote end of the logical link which transports the encrypted signaling data.

17 Claims, 3 Drawing Sheets

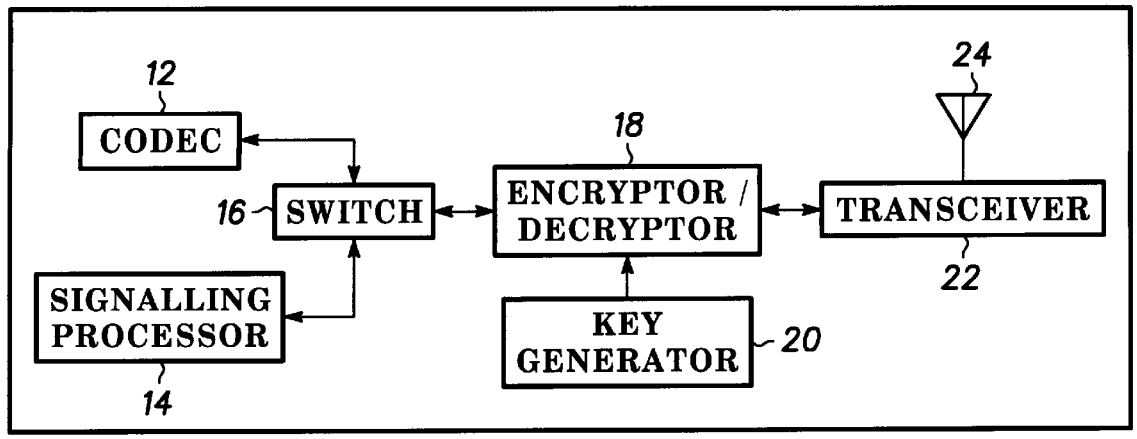
FIG. 1 - PRIOR ART -
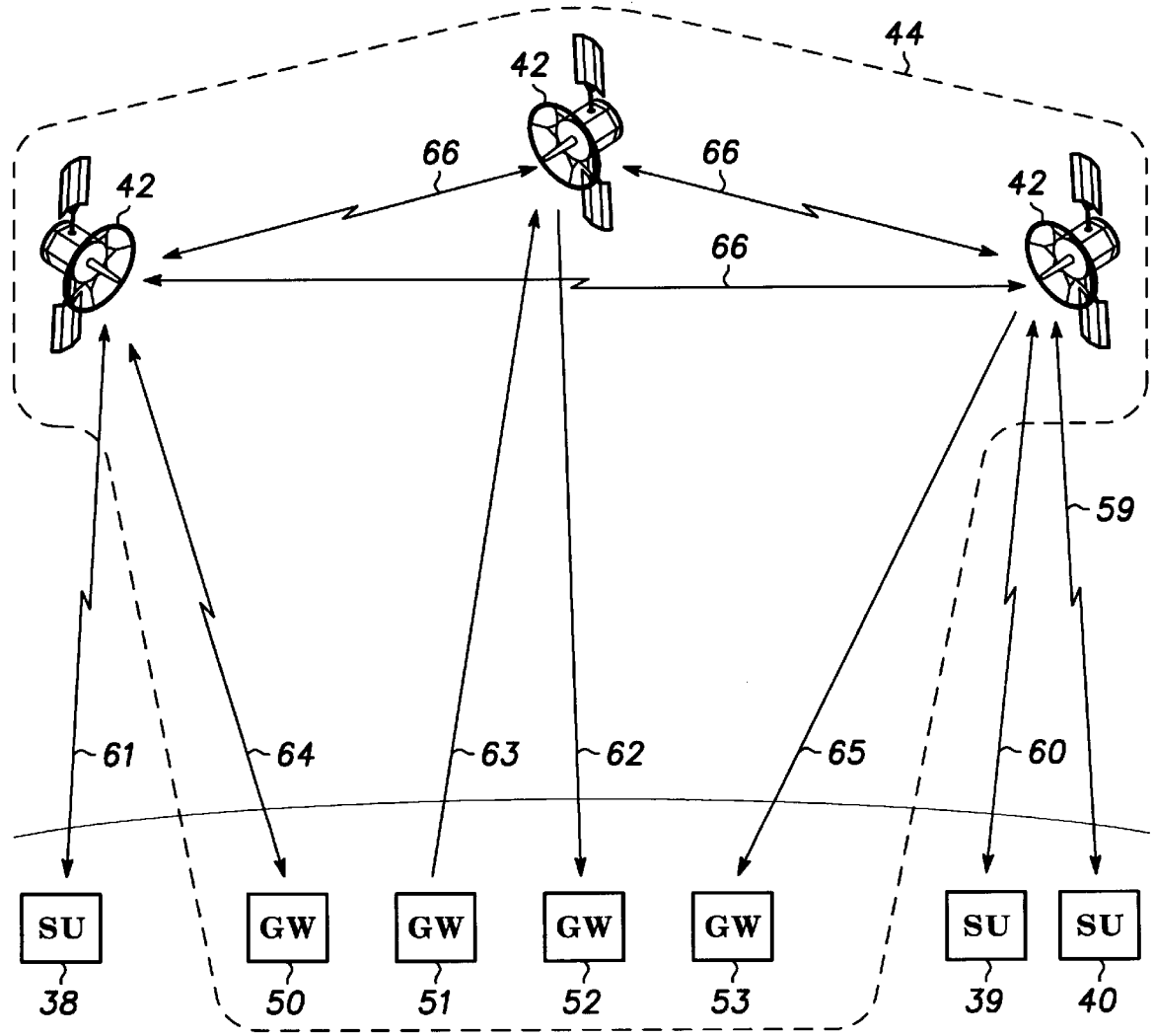
FIG. 2

METHOD AND APPARATUS FOR SIGNALING PRIVACY IN PERSONAL COMMUNICATIONS SYSTEMS

FIELD OF THE INVENTION

The present invention relates generally to communications systems, and more particularly to providing privacy of signaling data in communications systems in which traffic data and signaling data are sent to different destinations.

BACKGROUND OF THE INVENTION

Many communication systems currently use privacy techniques to provide voice and data confidentiality and to enhance user security. Encryption is used to prevent unauthorized users from accessing the contents of the communicated message. Encryption techniques have been implemented in cellular radiotelephone communication systems, personal communication systems, paging systems, and both wireline and wireless data networks.

The encryption aspect of privacy involves encryption/decryption of communicated messages. In a communication system, messages are carried in fundamental data packets. Data packets include a header portion, which contains routing and synchronization information, and a message payload portion. The payload contains the message content, which will generally be either signaling data or traffic data. Signaling data is information required to set up the call, establish communications links and grant access. Traffic data is the information, typically voice or digital data, whose content is the purpose of the message. Typically all message payloads, including those containing both signaling data and traffic data, are encrypted identically and at once using a cipher key.

Prior art cellular communication systems typically include at least one geographically fixed communication device in communication with one or more subscriber units via radio frequency (RF) communication links. The fixed communication device typically includes at least one switching center. In prior-art systems, both the switching center and the subscriber unit generate the same cipher key which is used for encryption. Thus, messages may be both encrypted and decrypted at both source and destination of the message. Accordingly, encryption prevents unintended listeners from accessing the contents of the message payload along the communication path between the source and destination.

FIG. 1 illustrates a prior-art subscriber unit having encryption capabilities. Subscriber unit 10 includes codec 12, signaling processor 14, switch 16, encryptor/decryptor 18, key generator 20, transceiver 22, and antenna 24. Along the transmit path, codec 12 encodes traffic (e.g., voice data) into a digital format which is suitable for encrypting. Processor 14 generates digital signaling data.

At times when encoded traffic is to be transmitted, switch 16 causes encoded traffic to be input to encryptor/decryptor 18. Similarly, at times when digital signaling data is to be transmitted, switch 16 causes digital signaling data to be input to encryptor/decryptor 18. Encryptor/decryptor 18 combines the encoded traffic or the digital signaling data with the cipher key, Kc, originating from key generator 20 and the resulting encrypted bitstream is ready for secure transmission via transceiver 22 and antenna 24.

Along the receive path, antenna 24 and transceiver 22 receive a secure transmission from a remote device. The secure transmission is input to encryptor/decryptor 18, which combines the transmission with the cipher key stream originating from key generator 20. This results in decrypted data packets which could include encoded traffic or digital signaling data. When the data packets include encoded traffic, switch 16 connects the packets to codec 12 which decodes the traffic. When the data packets include digital signaling data, switch 16 connects the packets to processor 14 which consumes the signaling data.

As described previously and illustrated in conjunction with FIG. 1, prior-art communication systems typically encrypt/decrypt message payloads containing either signaling data and traffic data in the same manner. Unfortunately, this technique does not work in some newer communications systems, which separate the processing location of messages containing signaling data from the processing location of messages containing traffic data. For example, one system communication device might handle call setup and a different communication device might be responsible for switching traffic. In prior-art systems of this type, privacy is not implemented for several reasons.

One reason that privacy is not implemented in such systems is that, under prior-art protocols, only the call setup communication device knows the cipher key associated with the calling subscriber unit for the given call. New protocols would have to be implemented to in order to synchronize and distribute the key generation variables to the other communication devices which need to encrypt/decrypt the data. In addition, when the signaling data and the traffic are encrypted together but are bound for different destinations, both encrypted signaling and traffic information would have to be sent to both destinations, consuming extra system resources. Alternatively, intermediate decryption/re-encryption processes would have to take place at intermediate system nodes in order to separate the signaling and traffic information and re-send the information in a secure manner to the respective destinations. This would add a substantial level of complexity to data transmissions, as well as adding delay to the communication path.

Without any privacy implemented in a communication system, message payloads are transmitted over a clear channel which allows a third party to monitor the channel and listen to the message contents. The lack of implementing signaling privacy in a communication system may impose certain security risks. Signaling data may include critical security information such as the subscriber unit's mobile subscriber identification number (MSI), access or authorization codes, the number being dialed, and geo-positional location information. This type of information could be intercepted by a third party over an unsecured transmission path.

Accordingly, it is desirable to provide an effective method of implementing privacy of signaling data in a communications systems which process signaling data messages and traffic data messages at a separate network processing nodes. In addition, it is desirable to accomplish signaling privacy without requiring modifications to well-established communications protocols.

BRIEF DESCRIPTION OF THE DRAWING

The invention will be better understood from a reading of the following detailed description taken in conjunction with the drawing in which like reference designators are used to designate like elements, and in which:

FIG. 1 illustrates a prior-art subscriber unit having encryption capabilities;

FIG. 2 is a simplified diagram of a network requiring multiple simultaneous connections that are terminated at distinct network processing nodes in accordance with a preferred embodiment of the present invention;

DETAILED DESCRIPTION

Figure 3:
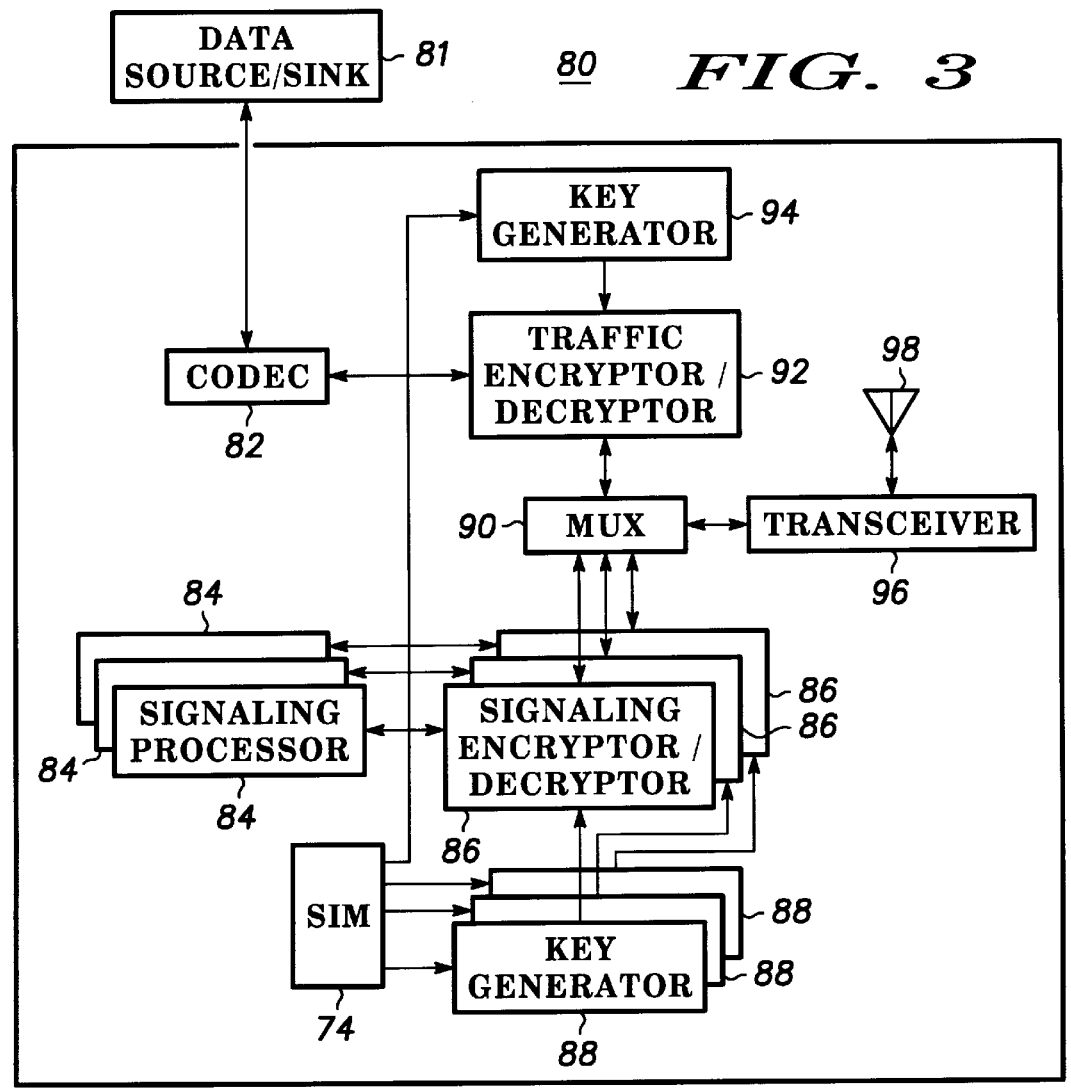
FIG. 3 is a block diagram of a subscriber unit in accordance with a preferred embodiment of the present invention.

The present invention provides signaling privacy in any network which requires multiple simultaneous connections that may be terminated at different distinct locations or network processing nodes. The present invention performs encryption/decryption of the signaling data message at the message level, where a virtual one-to-one connection exists between two network elements rather than at the transmission layer (i.e., at the physical layer, layer 1). This one-to-one connection is required in order to initiate and maintain cipher key synchronization.

Although encryption technology is tightly controlled by U.S. export control regulations, the regulations do allow export of certain types of encryption if it is applied narrowly as, for example, to a set of data, and especially when implemented to support fraud reduction. Accordingly, by limiting the encryption to the message level, some privacy can be afforded on the message contents. This technique provides an additional advantage in that the encryption/decryption algorithm can be less sophisticated than an algorithm used for mission data, and yet be equally secure over the duration of the call.

FIG. 2 illustrates a multi-nodal communication system 30 in accordance with a preferred embodiment of the present invention. Communication system 30 includes subscriber units 38–40 and network 44, which includes satellites 42 and gateways 50–53. In a preferred embodiment, communication system 30 provides essentially worldwide communications services through the use of orbiting satellites 42. Satellites 42 occupy orbits that may be low-earth orbits, medium-earth orbits, geosynchronous orbits, or a combination thereof.

Subscriber Units 38–40 (SU) may be, for example, handheld, portable cellular telephones adapted to transmit data to and/or receive data from satellites 42. SUs 38–40 may also be other communication units such as facsimile devices, pagers, data terminals or any other type of communication devices. Hard-wired telephony units (not shown) may also serve as communication terminals in communication system 30. These telephony units may communicate with the satellite network using Gateways 50–53.

Gateways 50–53 (GW) are equipment facilities, typically ground-based, that are capable of interfacing satellites 42 with ground-based equipment such as, for example, a public switched telephone network (PSTN) (not shown). GWs 50–53 may communicate directly with satellites 42, or may communicate via remote or co-located ground stations (not shown). In addition, GWs 50–53 perform functions such as call setup, billing, and subscriber monitoring, for example.

Satellites 42 operate as routing nodes for communication system 30, and communicate with terrestrial equipment which may be any number of SUs 38–40, GWs 50–53, and possibly other communication devices (not shown). Specifically, satellites 42 support links 59–61 with SUs 40 and links 62–65 with GWs 50–53. Satellites 42 also desirably communicate with other satellites 42 over cross links 66. Links 59–66 are referred to herein as "physical links".

"Logical links" also exist within communication system 30. As used herein, a "logical link" connotes a point-to-point connection between two system nodes. For example, a logical link exists between SU 38 and GW 53. This logical link utilizes physical links 65, 66, and 61 to establish a connection. A particular SU might support multiple logical links at any particular time. For example, an SU could simultaneously support a logical link with a satellite 42, and multiple other logical links with multiple GWs. In a preferred embodiment of the present invention, a particular SU can separately encrypt/decrypt data sent and received on each logical link, or the SU might encrypt data on one logical link while sending unencrypted data on another logical link. The ability of an SU to separately encrypt/decrypt the various logical links which it supports is described in detail, below. Multiple logical links may exist between two physical entities. For example an SU could simultaneously support two logical links to GW 50. Specifically, a separate logical link may be used for both traffic and signaling, although both are terminated in a single GW.

Communication system 30 may also include one or more System Control Stations (SCS) (not shown) to act as control facilities which control some operations of communication system 30. An SCS may communicate directly with satellites 42, or may communicate via remote or co-located ground stations (not shown). Physical and logical links can also be maintained between GWs 50–53, SUs 38–40, and SCSs.

Only three SUs 38–40 and satellites 42 and four GWs 50–53 are shown in FIG. 2 for clarity and ease of understanding. Those of skill in the art will understand based on the description that additional system facilities may be desirable, depending upon the requirements of the communication system.

In alternate embodiments, the method and apparatus of the present invention could be practiced in a terrestrial communication system or a combined terrestrial and satellite communication system. Applied to a terrestrial system (e.g., a GSM cellular system), Base Transceiver Subsystems (BTS) would be analogous to satellites 42, Base Site Controllers (BSC) and Mobile Switching Centers (MSC) would be analogous to GWs 50–53, and a cellular/PCS wireless network would be analogous to satellite-based network 44. Thus, in alternate embodiments, the method and apparatus of the present invention could be implemented in a terrestrial-based GSM system or any other wireless, wireline, or optical communication system.

FIG. 3 is a block diagram of a subscriber unit (SU) in accordance with a preferred embodiment of the present invention. Subscriber unit 80 includes codec 82, signaling processors 84, SIM 74, signaling encryptor/decryptors 86, signaling key generators 88, multiplexer 90 (MUX), transceiver 96, and antenna 98. In a preferred embodiment, subscriber unit 80 also includes traffic encryptor/decryptor 92 and traffic key generator 94, although in an alternate embodiment, these elements are not included and the traffic is not encrypted. In other alternate embodiments where the source of traffic is not voice, codec 82 would be replaced by some other data source, for example, an RS-232 connection to a portable computing device.

The method and apparatus of the present invention enables signaling data to be encrypted and decrypted separately from the traffic channel. Thus, when the traffic data and the signaling data are destined for different logical links, these links do not have to utilize precisely the same key. In addition, each logical link can maintain key synchronization independent of all other logical links.

In a preferred embodiment, a separate key generator with associated key synchronization is established for each peer-to-peer logical link. For example, in a mobile satellite system application, separate signaling connections are established between the SU and a satellite for link maintenance and channel control, and between the SU and a call setup gateway for mobility management and call control. Alternatively, in a GSM network, the SACCH signaling could be encrypted separately from the FACCH signaling.

Unlike the prior-art apparatus described in conjunction with FIG. 1, the apparatus of the present invention achieves separate encoding of the signaling channel by including one or more separate signaling encryptor/decryptors 86 along the signaling path. Signaling encryptor/decryptors 86 utilize a cipher key stream which is generated by key generator 88. The initial cipher key, Kc, originates from SIM 74, which uses a random number, RAND, to generate the original cipher key, Kc. The cipher key, Kc, determines the random bit sequence generated by the key generator, resulting in the cipher key stream.

Signaling data originates from a signaling processor 84 and is input to a signaling encryptor/decryptor 86. A cipher key stream is generated by a key generator 88 and also is input to the signaling encryptor/decryptor 86. The cipher key stream should remain synchronized with a cipher key stream which is generated at the destination of the encrypted signaling data. In a preferred embodiment, the GSM A5 algorithm is used by key generator 88 to generate the cipher key stream.

By performing encryption at the signaling message level, synchronization is simplified in many applications because the message protocols ensure that all transmittal messages are received, thus maintaining bit count integrity. Alternatively, synchronization can be maintained through the addition of header bits which are used to properly sequence received messages.

At times when encoded traffic is to be transmitted, MUX 90 selects encoded traffic originating from codec 82. Similarly, at times when encrypted signaling data is to be transmitted, MUX 90 selects encrypted signaling data originating from signaling encryptor/decryptor 86. For example, in the GSM cellular network protocols, signaling messages are sent by replacing traffic channel TDMA bursts with signaling FACCH bursts.

As stated previously, communication unit 80 could include a traffic encryptor/decryptor 92 and traffic key generator 94, although these elements are not required. Traffic encryptor/decryptor 92 combines the encoded traffic with the traffic cipher key stream originating from traffic key generator 94 and the resulting encrypted bitstream is ready for secure transmission via transceiver 96 and antenna 98. In an alternate embodiment, communication unit 80 does not include the second encryptor/decryptor 92 and key generator 94 and the encoded traffic or encrypted signaling data essentially pass through to transceiver 96. In a preferred embodiment, SIM 74 is used to generate a cipher key, $Kc_T$, for use by traffic key generator 94.

Encryptor/decryptors 86, 92 are configured to receive cipher key streams from key generators 88, 94. Encryptor/decryptors 86, 92 utilize key streams to encrypt and generate outgoing messages. Encryptor/decryptors 86, 92 also receive encrypted incoming messages. Using cipher keys streams, encryptor/decryptors 86, 92 decrypt these messages to generate incoming messages.

Encryptor/decryptors 86, 92 may be implemented to perform any number of encryption and decryption algorithms which are known by those skilled in the art. By way of example, the encryption/decryption algorithm may be implemented with the well-known DES algorithm. In a preferred embodiment, encryptor/decryptors 86, 92 exclusive-or the ciphered data with the key stream to perform decryption and exclusive-or the signaling data with the key stream to perform encryption, although either or both encryptors/decryptors 86, 92 could use different algorithms in alternate embodiments.

The cipher key streams generated by key generator 88 and key generator 94 could be the same or different. Cipher keys streams could be synchronized or not. There is no requirement for or against having the same cipher key for key generators 88, 94. In a preferred embodiment, key generator 88 and key generator 94 use the GSM A5 algorithm and Kc from SIM 74 to generate the cipher key stream.

During times when unencrypted signaling data and/or traffic are desired, either of key generators 88, 94 could be disabled in order to pass clear signaling data and/or traffic. For example, in one embodiment, signaling key generator 88 would be enabled and traffic key generator 94 would be disabled when only encrypted signaling data is desired.

Incoming and outgoing messages can be encrypted at any layer in the protocol stack. In a preferred embodiment, the encryption/decryption is performed at the messaging layer. For example, in a preferred embodiment, using GSM terminology, encryption/decryption is performed during DTAP processing so that the message is encrypted/decrypted by the BSC such that the BSC-to-MSC SCCP connection is not encrypted.

MUX 90 multiplexes the encrypted outgoing messages with other data. Transceiver 96 performs error encoding, interleaving, modulation, and other steps necessary to transmit the information on a signal that is transmitted on an RF link using an antenna 98. Transceiver 96 also receives signals on antenna 98, and performs demodulation, deinterleaving, error correction and other steps necessary to recover the underlying data stream, which is then separated into encrypted incoming messages and other data by MUX 90.

Figure 4:
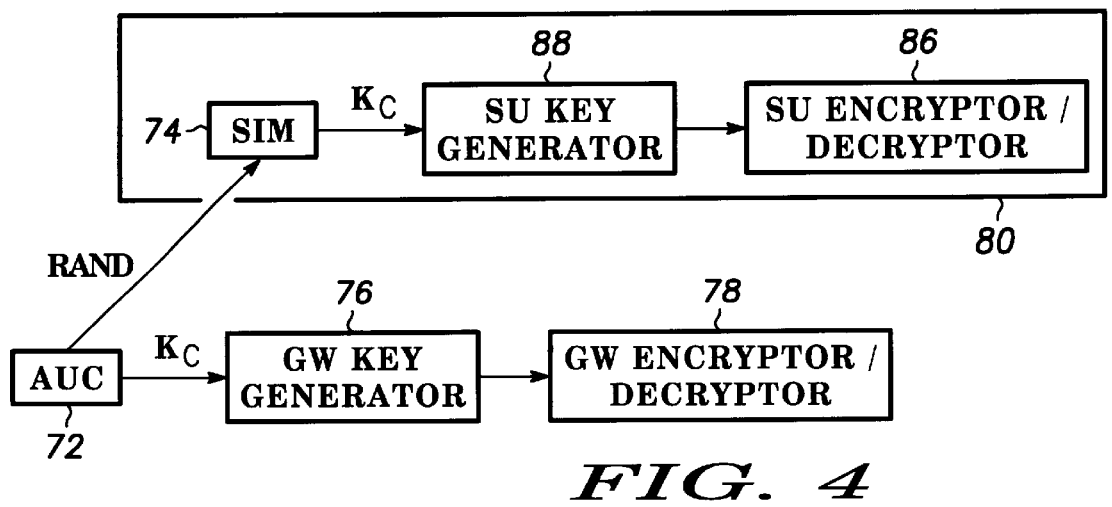
FIG. 4 is a block diagram illustrating key distribution within the network in accordance with a preferred embodiment of the present invention.

FIG. 4 is a block diagram illustrating key distribution within the network in accordance with a preferred embodiment of the present invention. Key distribution is initiated by authentication center 72 (AUC) which distributes the cipher key, Kc, and random number, RAND, to GW key generator 76 and subscriber unit SIM 74, respectively, which are also illustrated in FIG. 3. SIM 74, which is located within SU 80, calculates the cipher key, Kc, from RAND and distributes the cipher key, Kc, to SU key generator 88 so that it can produce a cipher key stream for SU encryptor/decryptor 86. GW key generator 76 also uses the cipher key, Kc, to produce a cipher key stream for GW encryptor/decryptor 78. Authentication center 72 can be located at any network processing node within network 30. In a preferred embodiment, AUC 72 is located at one or all GWs 50–53.

Figure 5:
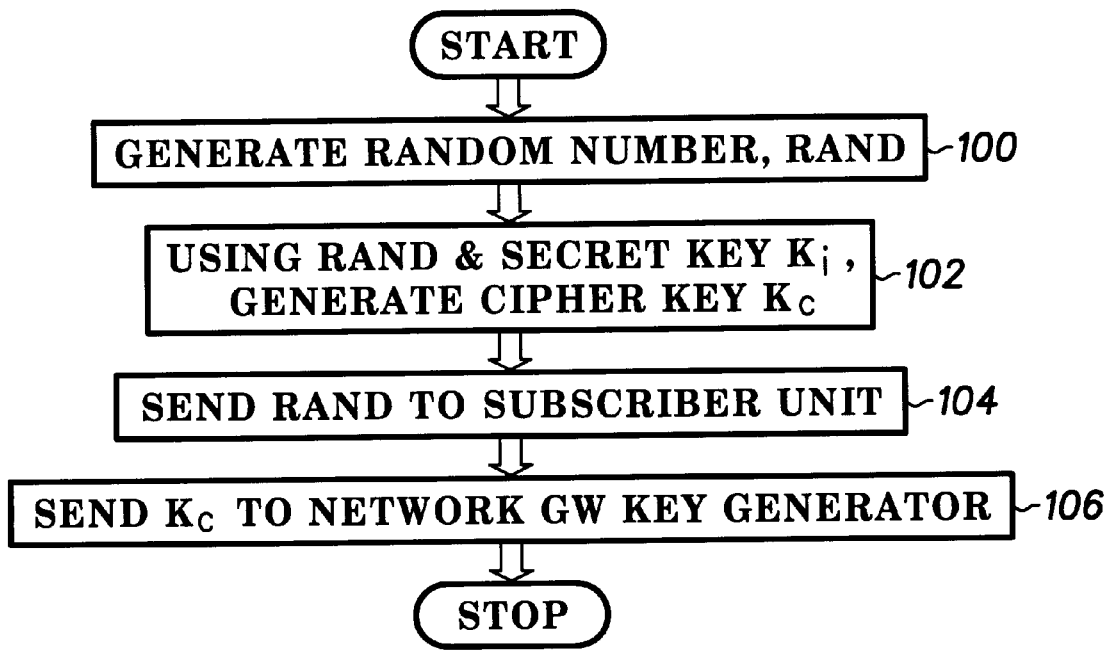
FIG. 5 is a flowchart which illustrates a method for generating the cipher key Kc to be used for a call in accordance with a preferred embodiment of the present invention.

FIG. 5 is a flowchart which illustrates a method for generating the cipher key Kc to be used for a call in accordance with a preferred embodiment of the present invention. To generate a cipher key Kc to be used by key generators 88, 94 (FIG. 3), a random number RAND is generated in a step 100. The random number RAND may be generated at any network processing node within the network 30. In the preferred embodiment, RAND is generated by the authentication center 72 (FIG. 4) (AUC).

In a step 102, the cipher key Kc is generated based on the random number RAND and the calling subscriber unit's secret key Ki. Secret key Ki is a fixed variable unique to the identity of the user. In the preferred embodiment, the authentication center 72 maintains a registry of the secret keys Ki for each subscriber unit, which is indexed by the identity of the calling subscriber unit. Using the random number RAND and the calling subscriber unit's secret key, Ki, the authentication center 72 computes the cipher key Kc using a trapdoor algorithm, such that knowledge of RAND and Kc can not be used to calculate Ki. In a preferred embodiment, RAND, Kc pairs are computed in advance, desirably using GSM algorithm A8, and stored to minimize setup time.

In a step 104, the random number RAND is sent to the subscriber unit 80. In a step 106, the cipher key Kc is sent to GW key generator 76 (FIG. 4). At the completion of step 106, the network 30 is properly staged to perform encryption/decryption for that particular call.

Figure 6:
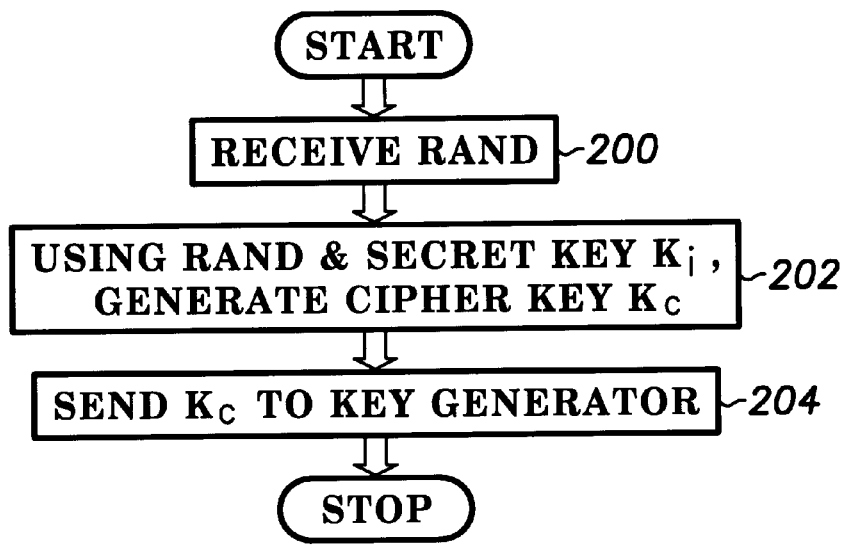
FIG. 6 is a flowchart of a method used to prepare a subscriber unit to perform signaling message encryption/decryption in accordance with a preferred embodiment of the present invention.

FIG. 6 is a flowchart of a method used to prepare a subscriber unit to perform signaling message encryption/decryption in accordance with a preferred embodiment of the present invention. In a step 200, SIM 74 (FIG. 4) within subscriber unit 80 receives the random number RAND. In a step 202, SIM 74 uses the random number RAND and a local copy of its secret key Ki to compute the cipher key Kc. In a step 204, the cipher key Kc is sent to key generator 88 in subscriber unit 80. At the completion of step 204, the subscriber unit 80 is properly staged to perform encryption/decryption for that call.

It is important to maintain synchronization between the network encryption/decryption unit 78 (FIG. 4) and SU encryption/decryption unit 86 in subscriber unit 80. If the transmission protocol of the communication system maintains a message count, synchronization can be maintained using these available message counters. If there is no such inherent reliable message count available, then alternate synchronization methods well known to those of skill in the art, such as the use of header or framing bits, are required.

The present invention may be used to provide signaling privacy in systems where the subscriber unit maintains separate distinct virtual connections between itself and the serving satellite, the call setup gateway, and the distribution gateway. In particular, the present invention implements signaling privacy on the subscriber-to-satellite signaling link, and on the subscriber-to-gateway link. In addition, this invention provides signaling privacy without requiring any modifications to existing communication system protocols.

Although the invention has been described in terms of the illustrative embodiment, it will be appreciated by those skilled in the art that various changes and modifications may be made to the illustrative embodiment without departing from the spirit or scope of the invention. For example, although the method and apparatus of the present invention are described in the context of a satellite communication system, they also could be implemented in a terrestrial RF or cellular system, as well as a landline or optical system or combination thereof. It is intended that the scope of the invention not be limited in any way to the illustrative embodiment shown and described but that the invention be limited only by the claims appended hereto.

What is claimed is:

1. A communication unit for use in a wireless communication system, the communication unit comprising:
    a traffic data key generator for generating a traffic cipher key stream;
    a traffic data encryptor coupled to the traffic key generator for encrypting traffic data with the traffic key stream;
    a signaling processor which produces signaling data, the signaling data being destined for a signal destination node of the wireless communication system;
    a signaling key generator which generates a signaling cipher key stream from a number stored on a subscriber information module (SIM);
    a signaling encryptor, coupled to the signaling processor and to the signaling key generator, which encrypts the signaling data using the signaling cipher key stream resulting in encrypted signaling data;
    a traffic data source which produces said traffic data, said traffic data being destined for a traffic destination node of the wireless communication system;
    a multiplexor coupled to the traffic data encryptor and the signaling encryptor for multiplexing the encrypted traffic data and encrypted signaling data;
    a transceiver, for transmitting the multiplexed encrypted signaling data and encrypted traffic data over a first RF link to a node of the wireless communication system.

2. The communication unit as claimed in claim 1 wherein the encrypted signaling data and encrypted traffic data are provided to the multiplexor in the form of, respectfully, signaling data packets and traffic data packets, wherein each data packet comprises a header portion and a payload portion, and wherein the payload portion of the signaling data packets comprises the signaling data, and the payload portion of the traffic data packets comprises the traffic data,
    and wherein the signaling data packets are routed to the signaling destination node of the wireless communication system over a first logical link, and wherein traffic data packets are routed to the traffic destination node of the wireless communication system over a second logical link.

3. The communication unit as claimed in claim 1 wherein the wireless communication system comprises a plurality of satellites moving with respect to earth's surface, and wherein the transceiver sends the encrypted signaling data and encrypted traffic data to one of the satellites of the communication system over said single RF link,
    and wherein the traffic destination node is either a called or calling party,
    and when the signaling destination node is said one satellite, said signaling data comprises link control data.

4. The communication unit as claimed in claim 1, wherein the signaling encryptor comprises a signaling decryptor portion coupled to the signaling processor and to the signaling key generator, which decrypts received encrypted signaling data using the signaling cipher key stream, resulting in decrypted signaling data, the signaling decryptor portion providing the decrypted signaling data to the signaling processor.

5. The communication unit as claimed in claim 3, further comprising:
    a second signaling encryptor which encrypts second signaling data using second signaling cipher key stream for secure transmission over a third logical link, said second signaling data comprising channel control information being routed over the third logical link to second signaling destination node of the wireless communication system, the second signaling destination node being a gateway.

6. The communication unit as claimed in claim 5, further comprising:
a second signaling key generator, coupled to the second signaling encryptor, which generates the second signaling cipher key stream.

7. The communication unit as claimed in claim 6, further comprising:
a second signaling processor, coupled to the second signaling encryptor, which produces the second signaling data to be encrypted by the second signaling encryptor.

8. The communication unit as claimed in claim 3 wherein the signaling data comprises channel control information.

9. The communication unit as claimed in claim 8 wherein the traffic data encryptor comprises a traffic decryptor portion, coupled to the traffic key generator, the traffic data encryptor portion decrypting incoming encrypted traffic data using the traffic key stream.

10. A wireless communication system comprising:
an authentication center (AUC) which produces a signaling cipher key and a random number, and stores the random number on a SIM card;
a wireless communication device comprising a signaling key generator for retrieving the random number from the SIM card and generating the signaling cipher key from the random number, and using the signaling cipher key to generate a signaling cipher key stream used to encrypt signaling data resulting in encrypted signaling data; and
a gateway which receives the cipher key from the AUC, and uses the cipher key to decrypt the encrypted signaling data received from the wireless communication device through a first logical channel; and
a satellite coupled to the wireless communication device by an RF link,
said wireless communication device further comprising a traffic key generator for generating a traffic key stream, a traffic encryptor for encrypting traffic data with the traffic key stream, a multiplexor for multiplexing the encrypted signaling data with the encrypted traffic data, and a transceiver for transmitting the multiplexed data over the RF link to the satellite, the encrypted traffic data being routed to a called or calling party through a second logical channel.

11. The communication system as claimed in claim 10, wherein the wireless communication device further comprises a second signaling key generator for generating a second signaling cipher key stream for encrypting second signaling data, the second signaling data destined for use the satellite, the second signaling data comprising information for managing said RF link.

12. A method for securely communicating signaling data from a wireless communication device to a first destination device of a satellite communication system, and communicating traffic data to a second destination device, the method comprising the steps of:
generating a signaling cipher key by a signaling key generator using a random number stored on a SIM of the wireless communication device;
encrypting the signaling data, by a signaling encryptor, using the cipher key resulting in encrypted signaling data;
encrypting traffic data with a traffic data encryptor using a traffic cipher key stream;
multiplexing the encrypted signaling data and the encrypted traffic data for transmission to a satellite of the satellite communication system;
transmitting the encrypted signaling data over a first logical link to the first destination device, the first logical link comprising a first set of physical links;
transmitting the encrypted traffic data over a second logical link to a second destination device, the second logical link comprising a second set of physical links,
wherein the first and second sets of physical links comprise a common RF link between the wireless communication device and the satellite.

13. The method as claimed in claim 12, further comprising the steps of:
receiving second encrypted signaling data from the second destination device; and
decrypting the second encrypted signaling data by a signaling decryptor, using the signaling cipher key.

14. A method of operating a communication device for securely communicating signaling and traffic data in a wireless communication system, the method comprising the steps of:
generating a signaling cipher key stream with a signaling key generator;
encrypting signaling data using the signaling cipher key stream, the signaling data comprising channel control information;
multiplexing the encrypted signaling data and traffic data for transmission to a satellite of the wireless communication system, wherein the encrypted signaling data is routed over a first logical link to a first destination device, and the traffic data is routed over a second logical link to a second destination device, wherein the first and second logical links share a common RF link between the communication device and the satellite.

15. The method as claimed in claim 14 wherein the first destination device is a gateway of the communication system, and the method further comprises the steps of:
encrypting second signaling data with a second signaling cipher key stream, said second signaling data being destined for said satellite and comprising information for controlling the RF link between the satellite and the communication unit;
multiplexing the encrypted second signaling data with the encrypted signaling data and traffic data for transmission to the satellite.

16. A wireless communication system comprising:
an authentication center for producing a signaling cipher key and a random number and stores the random number of a SIM card;
a gateway which uses the signaling cipher key to decrypt encrypted signaling data, the encrypted signaling data being produced by a wireless communication device using the random number from the SIM card;
a satellite communication node coupling the wireless communication device to the wireless communication system by an RF link,
wherein multiplexed data comprising encrypted traffic data and the encrypted signaling data is received by the satellite from the wireless communication device, the encrypted traffic data being produced by the wireless communication device using a traffic cipher key that is different from the signaling cipher key, the encrypted traffic data being routed over a first logical link through the wireless communication system to a traffic destination node, the encrypted signaling data being routed over a second logical link through the wireless communication system to the gateway.

17. The wireless communication system as claimed in claim 16 wherein the signaling data is first signaling data, and the communication unit produces encrypted second signaling data, and wherein the satellite receives multiplexed data comprised of the encrypted traffic data, the encrypted first signaling data and the encrypted second signaling data, and wherein the second signaling data comprises link control data and is destined for receipt by the satellite communication node.

* * * * *